Figure 12:
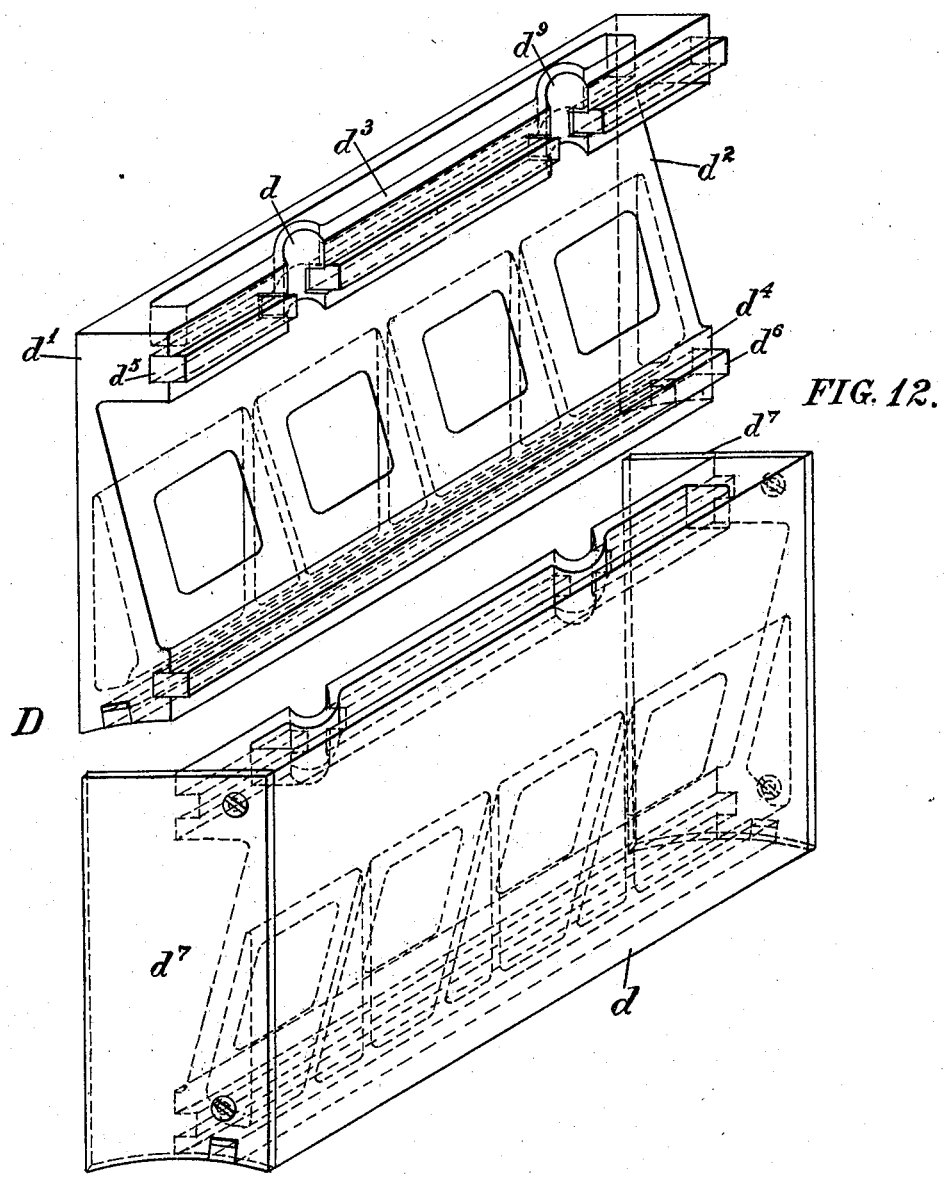

No. 823,885. PATENTED JUNE 19, 1906.
W. LISTER.
ROTARY ENGINE.
APPLICATION FILED FEB. 11, 1904. RENEWED MAR. 23, 1906.
6 SHEETS—SHEET 1.
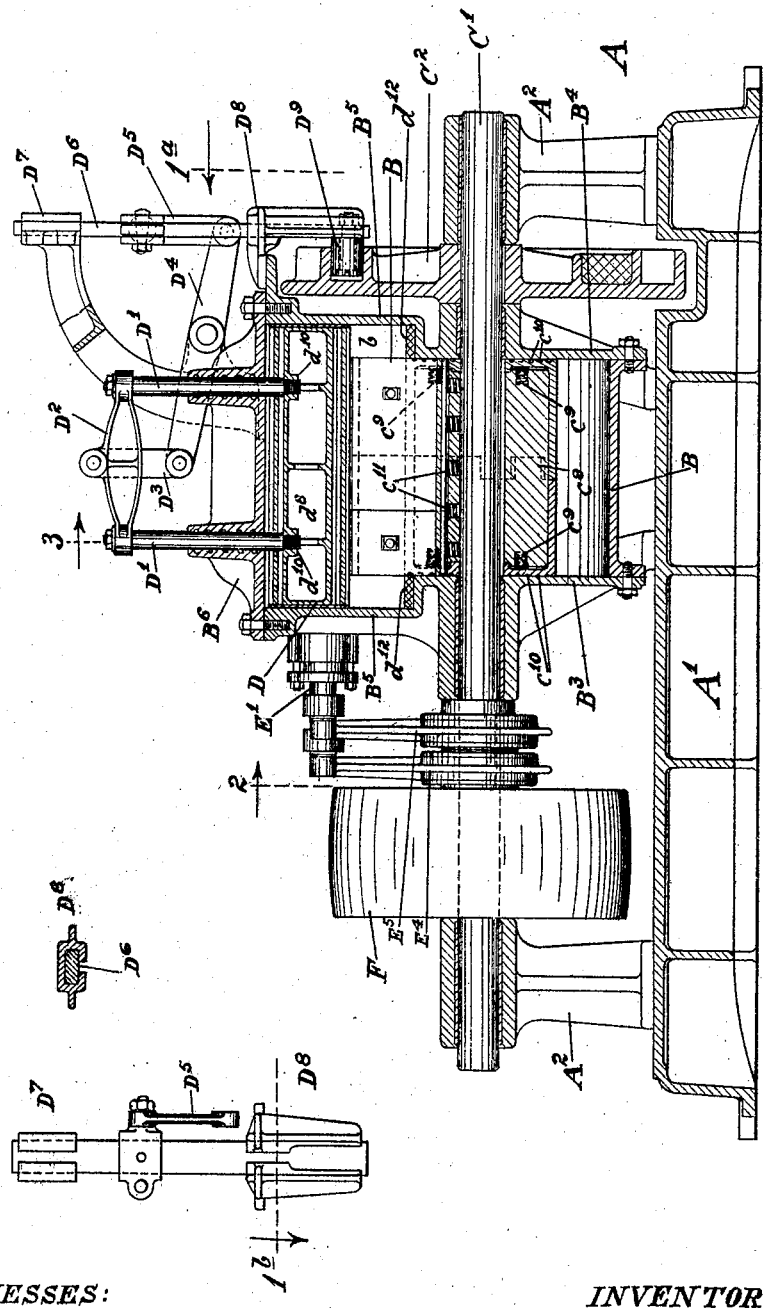
WITNESSES:
INVENTOR:
William Lister
BY
ATTORNEYS.

No. 823,885. PATENTED JUNE 19, 1906.
W. LISTER.
ROTARY ENGINE.
APPLICATION FILED FEB. 11, 1904. RENEWED MAR. 23, 1906.
6 SHEETS—SHEET 2.
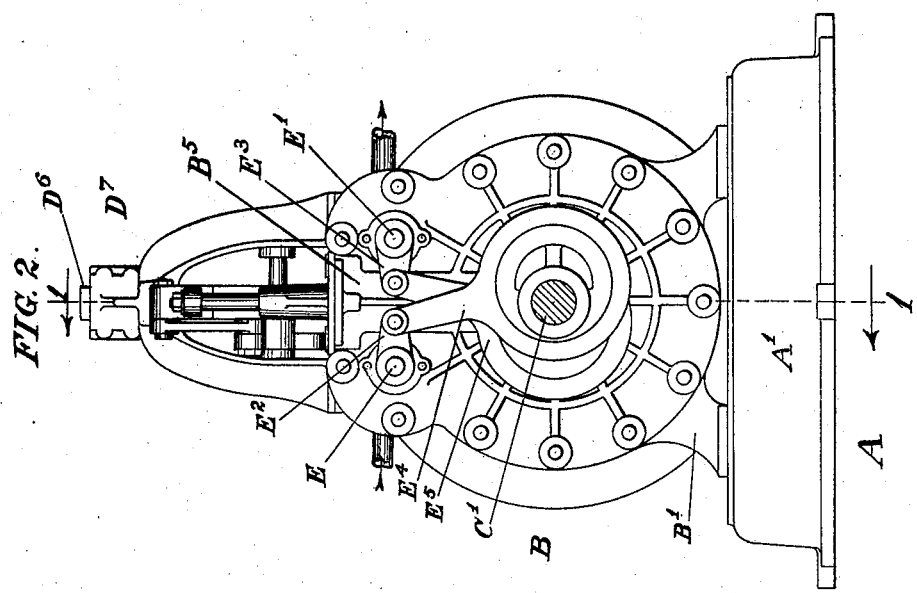
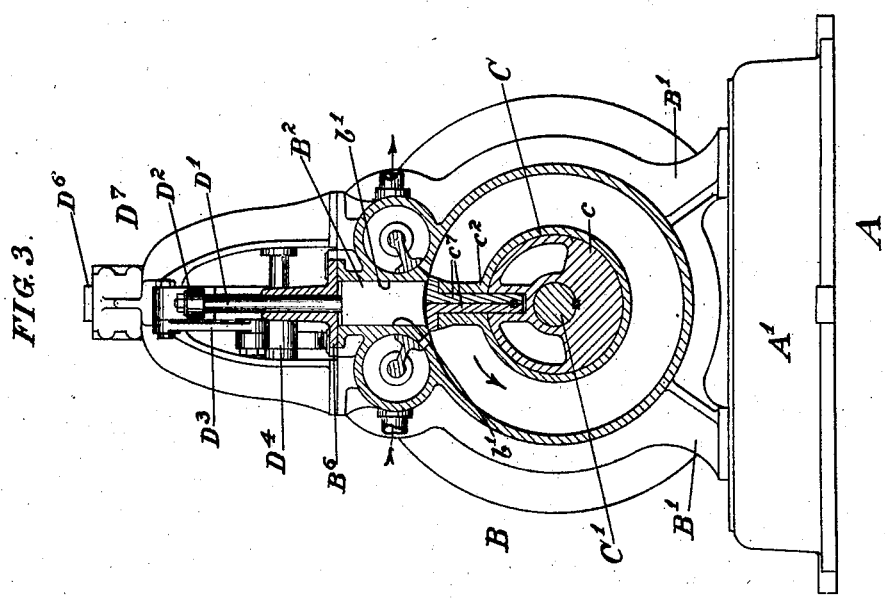
WITNESSES:
Geo. M. Mayer
J. Mandegren
INVENTOR:
William Lister
BY Dynforth Dynforth & Lee,
ATTORNEYS.

No. 823,885. PATENTED JUNE 19, 1906.
W. LISTER.
ROTARY ENGINE.
APPLICATION FILED FEB. 11, 1904. RENEWED MAR. 23, 1906.
6 SHEETS—SHEET 3.
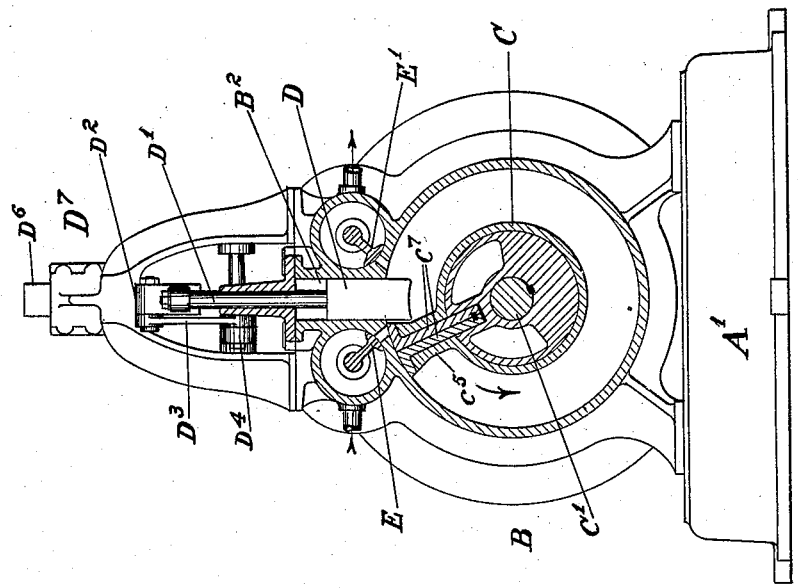
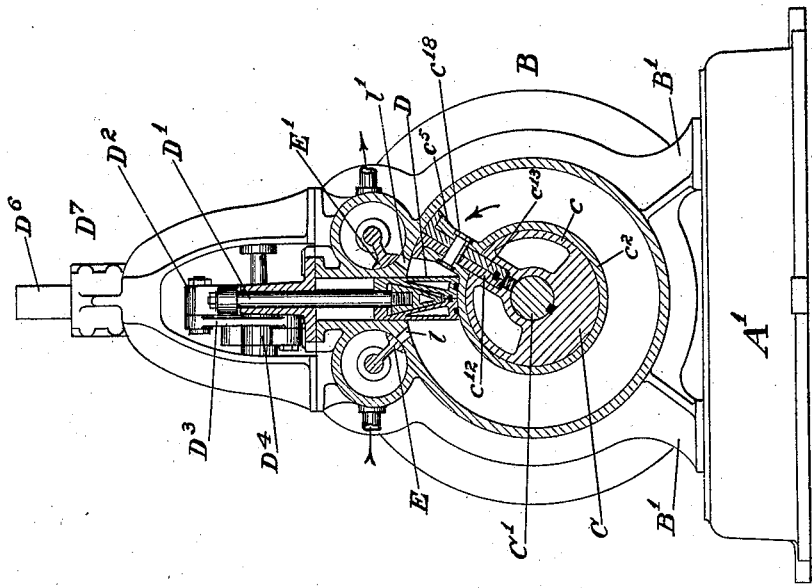
WITNESSES:
INVENTOR:
William Lister
BY
ATTORNEYS.

No. 823,885. PATENTED JUNE 19, 1906.
W. LISTER.
ROTARY ENGINE.
APPLICATION FILED FEB. 11, 1904. RENEWED MAR. 23, 1906.
6 SHEETS—SHEET 4.
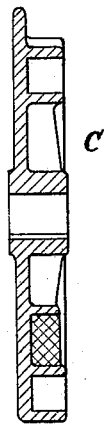
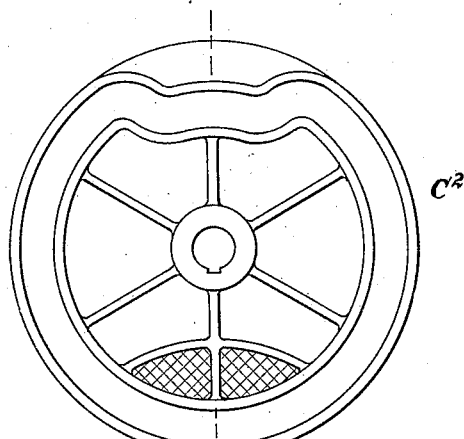
FIG. 6.
FIG. 7.
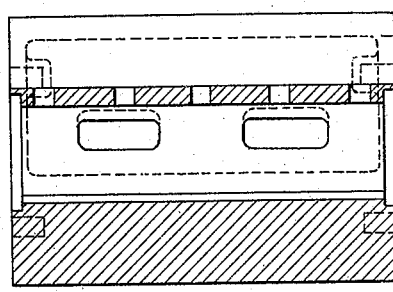
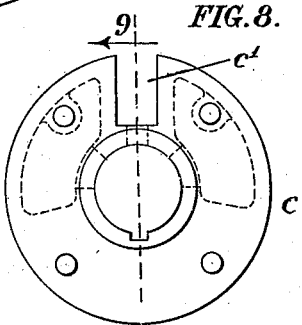
FIG. 9.
FIG. 8.
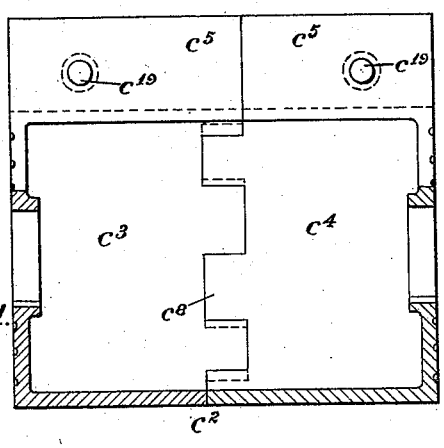
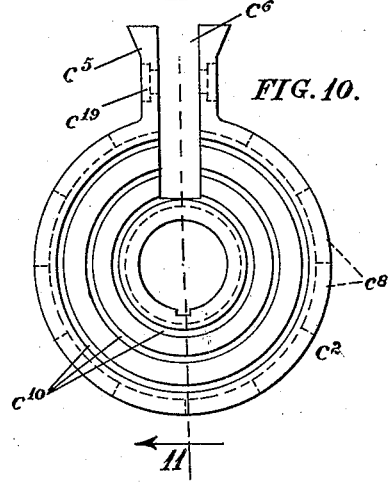
FIG. 11.
FIG. 10.
WITNESSES:
Geo. H. Mayer
I. Mandegren
INVENTOR:
William Lister
BY
ATTORNEYS.

No. 823,885. PATENTED JUNE 19, 1906.
W. LISTER.
ROTARY ENGINE.
APPLICATION FILED FEB. 11, 1904. RENEWED MAR. 23, 1906.

6 SHEETS—SHEET 5.

WITNESSES:

INVENTOR:
William Lister
BY
ATTORNEYS.

No. 823,885. PATENTED JUNE 19, 1906.
W. LISTER.
ROTARY ENGINE.
APPLICATION FILED FEB. 11, 1904. RENEWED MAR. 23, 1906.
6 SHEETS—SHEET 6.
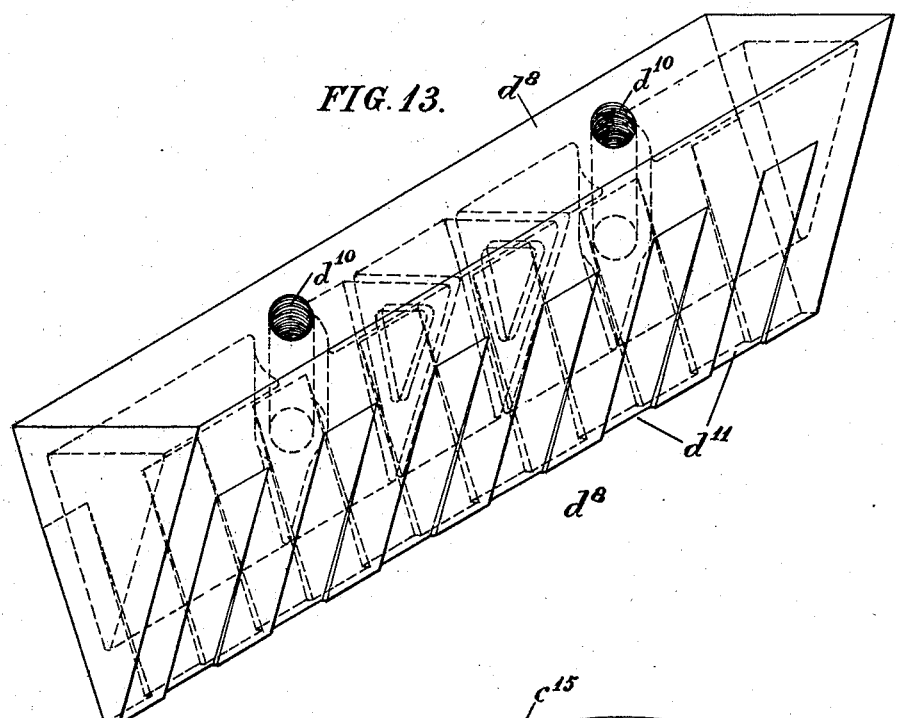
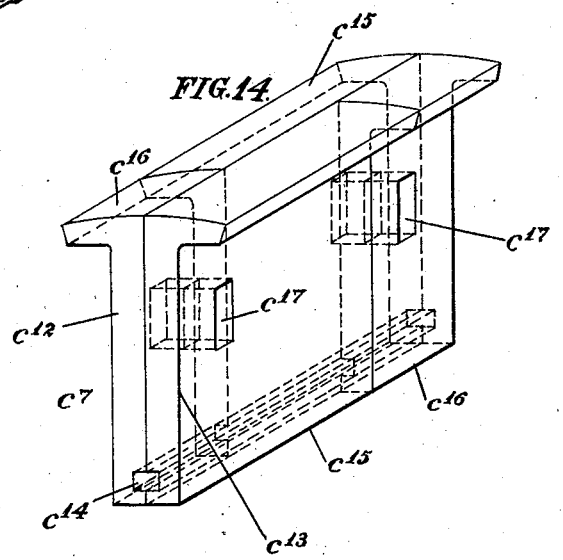
WITNESSES:
INVENTOR:
ATTORNEYS.

UNITED STATES PATENT OFFICE.

WILLIAM LISTER, OF CHICAGO, ILLINOIS.

ROTARY ENGINE.

No. 823,885.      Specification of Letters Patent.      Patented June 19, 1906.

Application filed February 11, 1904. Renewed March 23, 1906. Serial No. 307,708.

*To all whom it may concern:*

Be it known that I, WILLIAM LISTER, a citizen of the United States, residing at Chicago, in the county of Cook and State of Illinois, have invented a new and useful Improvement in Rotary Engines, Pumps, &c., of which the following is a specification.

My invention relates particularly to rotary steam-engines, although my invention may be employed with any suitable motive power.

My primary object is to provide a rotary engine of improved construction, particular attention being paid to the provision of means for preventing undue leakage of steam with attendant loss of power.

My invention is illustrated in its preferred embodiment in the accompanying drawings, in which—

Figure 1 is a longitudinal sectional view of the engine taken as indicated at line 1 of Fig. 2; Fig. $1^a$, a broken end elevational view taken as indicated at line $1^a$ of Fig. 1; Fig. $1^b$, a section taken as indicated at line $1^b$ of Fig. $1^a$; Fig. 2, a transverse section taken as indicated at line 2 of Fig. 1; Fig. 3, a transverse section taken as indicated at line 3 of Fig. 1 and showing the engine at the instant when the abutment of the rotary piston lies between the admission and exhaust valves; Fig. 4, a similar section, but showing the piston advanced somewhat from the position shown in Fig. 3, the admission-valve being about to open; Fig. 5, a similar section showing the piston about to complete its revolution; Fig. 6, an outer view of a rotary cam employed; Fig. 7, a section taken as indicated at line 7 of Fig. 6; Fig. 8, an end view of a core constituting a member of the rotary piston employed; Fig. 9, a longitudinal section of the core, taken as indicated at line 9 of Fig. 8; Fig. 10, an end view of a two-part core-casing employed for the purpose of preserving steam-tight joints; Fig. 11, a section taken as indicated at line 11 of Fig. 10; Fig. 12, an enlarged perspective view showing the sections of the reciprocating gate, forming the non-rotating abutment of the engine; Fig. 13, an enlarged perspective view showing the wedge employed in connection with the members shown in Fig. 12, and Fig. 14 an enlarged perspective view of the cylinder contacting members of the rotary piston which are self-adjusting to accommodate for wear.

A description of the preferred construction is as follows:

A represents a frame comprising a base A' and journal-standards $A^2$; B, a stationary cylinder provided at its lower side with supports B', resting upon the base A' and provided at its top side with a slotted longitudinal enlargement or gate-guide $B^2$; $B^3$ $B^4$, removable ends for the cylinder provided with upward extensions $B^5$, forming ends for the gate-guide; $B^6$, a top plate for the gate-guide; C, a rotary piston supported on a shaft C', journaled in the cylinder ends and in the bearings $A^2$; $C^2$, a rotary cam carried by the shaft C' and located adjacent to one of the cylinder ends; D, a vertically-reciprocating gate or non-rotary abutment located in the guide $B^2$ and equipped with upwardly-projecting stems D', extending through suitable guides with which the top plate $B^6$ is provided; $D^2$, a longitudinally-extending cross-head joining the upper ends of the plungers or stems D'; $D^3$, a link connected with said cross-head and with one end of a lever $D^4$, fulcrumed on a stationary pivot; $D^5$, a link connected with one end of said lever and with a vertically-reciprocating slide or plunger $D^6$, working in guides $D^7$ $D^8$; $D^9$, a cam-roller engaging a cam-slot in the outer face of the cam $C^2$ and journaled on a pivot attached to the lower end of the slide $D^6$; E E', valves located in suitable valve-chambers flanking the guide $B^2$ and having stems projecting through the extension $B^5$ of the cylinder end $B^3$ and equipped with actuating-arms $E^2$ $E^3$, respectively, which in turn are connected, respectively, with eccentric-straps $E^4$ $E^5$, and F a pulley fixed to the shaft C' adjacent to the eccentric $E^4$.

The end surfaces of the cylinder B and of the lateral extension on the cylinder forming the guide $B^2$ lie in the same planes. The projections $B^5$ of the cylinder ends are ribbed lengthwise and provided internally with radial slots, whose vertical side walls $b$ are flush with the side walls of the slot of the guide $B^2$. Thus when the cylinder ends are secured in place the gate D projects from the ends of the guide $B^2$ into the slots in the projections $B^5$ of the cylinder ends, as appears from Fig. 1.

The piston C comprises a core $c$, Figs. 8 and 9, provided at one side with a longitudinal slot $c'$, a two-part shell $c^2$, Figs. 10 and 11, comprising cylindrical members $c^3$ $c^4$, receiving the core $c$ and provided with ends, as shown, and equipped also with alined wings $c^5$, provided with longitudinal slots $c^6$, registering with the slot $c'$, and a self-adjusting cylinder-contacting member $c^7$, Fig. 14, confined in the registering slots $c'$ $c^6$. The members $c^3$ $c^4$ of the shell are provided at their meeting edges with intermeshing tenons and grooves $c^8$, whose lateral surfaces fit nicely together to provide steam-tight joints. The shell fits snugly upon the core, and springs $c^9$ are interposed between the ends of the core and the ends of the extensible shell when the parts are assembled as shown in Fig. 1. The external surfaces of the ends of the shell are provided with oil or water grooves $c^{10}$. The cylinder-contacting member $c^7$ of the abutment is maintained normally in contact with the inner cylindrical surface of the cylinder by means of springs $c^{11}$, interposed between the inner end of the member $c^7$ and the bottom of the slot $c'$. The member $c^7$ comprises two L-shaped side pieces $c^{12}$ $c^{13}$ and a key $c^{14}$, joining said side members at their lower portions. Each side member comprises a relatively long section $c^{15}$ and a relatively short section $c^{16}$, the vertical joints being staggered with relation to each other. Registering vertical slots $c^{17}$ are provided in the sections, which receive bolts $c^{18}$, Fig. 5, extending through said slots and into perforations $c^{19}$, Fig. 10, in the wings $c^5$ of the shell $c^2$. Thus it will be understood that when the shell expands longitudinally under the force of its springs the cylinder-contacting member $c^7$ also expands longitudinally, each section $c^{15}$ and companion section $c^{16}$ being moved by the bolt connection with the wings $c^5$ of the shell, so that the sections of the side members $c^{12}$ $c^{13}$ spread at the staggered joints mentioned.

The reciprocating gate or non-rotating abutment D comprises, Figs. 12 and 13, two side members $d$ $d'$, provided at their inner sides with downwardly-converging surfaces $d^2$ and having meeting top flanges $d^3$ and meeting bottom flanges $d^4$, keys $d^5$ $d^6$, respectively, joining said flanges, end plates $d^7$, removably secured to the member $d$ and projecting so as to cover the end surfaces of the member $d'$, and a wedge $d^8$, Fig. 13, having downwardly-converging lateral surfaces and confined between the side members $d$ $d'$. The key connection is such as to permit lateral separation of the side members $d$ $d'$. The top flanges of the side members are provided with half-circular perforations $d^9$, which receive the stems B', the lower ends of said stems having threaded connection at the points $d^{10}$ with the upper portion of the wedge $d^8$. The wedge is shown hollow, although the means whereby the casting may be made hollow are not indicated, this being well understood in the art. The side surfaces of the wedge are cut away at intervals at the places indicated at $d^{11}$. The wedge has a slightly vertical motion with relation to the sectionally-constructed shell within which it is inclosed, the purpose of the construction being to expand the gate when the latter is in its depressed position—that is, seated upon the cylindrical surface of the rotary piston. The effect of this expansion is to provide lateral steam-tight joints between the gate and its guide, as will be understood by reference to Fig. 5. The vertical slots in the projections B⁵ of the cylinder ends are provided at their bottoms with soft metallic packings $d^{12}$, which form cushions for the gate or abutment.

The valves E E' control the admission-port $e$ and exhaust-port $e'$, and it will be understood that when the engine is employed as a simple non-condensing engine the exhaust-valve may be dispensed with. The engine as constructed may be caused to work in either direction by properly setting the eccentrics on the shaft C'. No means for controlling the eccentrics are shown; but it will be understood that in practice suitable link-motions are employed for manually controlling the eccentrics, and thereby regulating the operation of the engine.

The shape of the cam-groove of the cam $C^2$ is such, as appears from Fig. 6, that the slide $D^6$ will be depressed and the gate held for a brief interval in an elevated position at each revolution of the piston while the abutment of the piston is passing the gate. The movements of the gate are quick, so that the piston has a long working stroke, as will be understood from an inspection of Figs. 4 and 5.

The "blowing through" of steam in rotary engines has been one of the most serious difficulties to overcome in rotary-engine construction. With a view to overcoming this difficulty I have given particular attention to the provision of self-adjusting means for maintaining close joints at all points where the same are necessary.

While my invention is particularly applicable to rotary engines, certain features of the invention are applicable to rotary pumps, &c.

The piston-contacting surface of the gate D should be of greater width (circumferentially measured) than the tenons $c^8$, so that after a separation of the piston-shell $c^2$ in compensating for wear the bottom of the gate will span the lateral surfaces of each tenon as the same passes beneath the gate and prevent "blowing back" of steam.

It will be understood that many changes in details of construction within the spirit of my invention may be made. Hence no undue limitation should be understood from the foregoing detailed description.

What I regard as new, and desire to secure by Letters Patent, is—

1. The combination of a stationary cylinder, a rotary piston, gate-actuating means, and a reciprocating gate comprising side sections, and a relatively movable intermediate member through the medium of which the gate is expanded when seated, for the purpose set forth.

2. The combination of a stationary cylinder, a rotary piston, gate-actuating means, and a reciprocating gate comprising side sections and an interposed wedge member having lost-motion connection with said side sections and serving to actuate the gate and to expand the same when seated, for the purpose set forth.

3. The combination of a stationary cylinder, a rotary piston, gate-actuating means, and a reciprocating gate comprising side sections and an interposed wedge member, said side sections being keyed together to permit expansion of the gate when the gate is in its depressed position, for the purpose set forth.

4. In a rotary engine, a laterally-expansible gate for a stationary cylinder, comprising two suitably-connected side sections provided interiorly with beveled surfaces, and an interposed wedge provided with coacting lateral beveled surfaces, for the purpose set forth.

5. In a rotary engine, a laterally-expansible gate for a stationary cylinder, comprising two suitably-connected side sections provided interiorly with beveled surfaces and having bottom flanges keyed to permit separation and top flanges perforated to permit passage of stems, an interposed wedge free to move relatively to said side sections, and stems extending through the top flanges of said side members, for the purpose set forth.

6. The combination of a stationary cylinder having a longitudinal slotted enlargement at its top, removable ends for said cylinder having projections covering the ends of said enlargement, a removable top plate for said enlargement provided with perforations, a gate movable vertically in said slot provided with stems projecting through said top plate, a cross-head connecting said stems, actuating means for the cross-head, including a lever and a vertically-movable slide, a rotary piston, and a rotary cam serving to actuate said slide, for the purpose set forth.

7. The combination with a stationary cylinder, of a rotary piston therein, comprising a core, and an extensible shell enveloping said core and provided with suitable cylinder end contacting surfaces, for the purpose set forth.

8. The combination with a stationary cylinder, of a rotary piston therein, comprising a core, and a shell comprising two substantially cylindrical sections provided with ends for contacting with the cylinder ends, and springs tending to separate said sections and maintain close joints at said ends, for the purpose set forth.

9. The combination with a stationary cylinder, of a rotary piston therein, comprising a core having a longitudinal lateral slot, a longitudinally-extensible cylinder-contacting member in said slot, and a longitudinally-extensible cylindrical shell with a slotted lateral abutment receiving said cylinder-contacting member, said abutment being connected with said cylinder-contacting member, whereby the shell and said member are caused to expand simultaneously, for the purpose set forth.

10. In a rotary engine, a rotary piston, comprising a core having a lateral slot, a shell comprising two cylindrical members provided with ends and having lateral projections provided with longitudinal slots, and a radially-self-adjusting cylinder-contacting member confined in said slots and having sections connected, respectively, with the corresponding sections of said shell and movable therewith to produce longitudinal extension, for the purpose set forth.

11. In a rotary engine, a rotary piston comprising a core, a shell enveloping said core comprising two sections having ends contacting with the ends of the cylinder and adjacent edges connected by mortise-and-tenon joints, said sections having lateral abutments provided with alined slots, and a cylinder-contacting abutment member in said slots, for the purpose set forth.

12. In a rotary engine, the combination of a stationary cylinder equipped with a longitudinal gate-guide, a gate confined in said guide and provided with longitudinally-alined stems, a cross-head joining said stems, a lever swinging in a longitudinal plane and having one end linked to said cross-head, a slide linked to the other end of said lever, and a cam on the shaft of the piston actuating said slide, for the purpose set forth.

13. In a rotary engine, the combination of a piston having an extensible shell comprising members fitted together with interlocking tenons, a cylinder, and a gate having a piston-contacting surface of greater width than said tenons, whereby "blowing back" of the fluid underneath the gate is prevented, for the purpose set forth.

14. A piston for a machine of the character set forth, comprising a core and a longitudinally-extensible shell for said core comprising two cylindrical members movable with relation to said core, for the purpose set forth.

15. A gate for a machine of the character described, comprising two side members provided with internal downwardly-converging surfaces and a wedge confined between said members and movable with relation thereto, for the purpose set forth.

16. The combination of a stationary cylinder having a lateral longitudinally-extending gate-guide, an expansible gate in said guide of greater length than the body of the cylinder, cylinder ends having radial grooves forming prolongations of the gate-guide, and means for actuating said gate, said gate making fluid-tight joints with the side walls of its guide when the gate is seated, for the purpose set forth.

WILLIAM LISTER.

In presence of—
L. HEISLAR,
WALTER N. WINBERG.